US010998551B2

(12) United States Patent
Sawada et al.

(10) Patent No.: US 10,998,551 B2
(45) Date of Patent: May 4, 2021

(54) ELECTRODE MATERIAL FOR ELECTRICITY STORAGE DEVICES, ELECTRODE FOR ELECTRICITY STORAGE DEVICES, AND ELECTRICITY STORAGE DEVICE

(71) Applicant: SEKISUI CHEMICAL CO., LTD., Osaka (JP)

(72) Inventors: Yuuki Sawada, Osaka (JP); Hiroki Masuda, Osaka (JP); Akira Nakasuga, Osaka (JP); Akihiko Fujiwara, Osaka (JP); Takuya Wada, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/321,332

(22) PCT Filed: Aug. 29, 2017

(86) PCT No.: PCT/JP2017/030920
§ 371 (c)(1),
(2) Date: Jan. 28, 2019

(87) PCT Pub. No.: WO2018/043481
PCT Pub. Date: Mar. 8, 2018

(65) Prior Publication Data
US 2019/0173087 A1 Jun. 6, 2019

(30) Foreign Application Priority Data

Aug. 31, 2016 (JP) .............................. JP2016-168845
Jun. 14, 2017 (JP) .............................. JP2017-116522

(51) Int. Cl.
| H01M 4/62 | (2006.01) |
| H01M 4/131 | (2010.01) |
| H01M 4/36 | (2006.01) |
| H01M 4/505 | (2010.01) |
| H01M 4/525 | (2010.01) |
| H01M 10/0525 | (2010.01) |
| H01M 4/02 | (2006.01) |
| H01G 11/32 | (2013.01) |
| H01G 11/34 | (2013.01) |
| H01G 11/40 | (2013.01) |

(52) U.S. Cl.
CPC ............ *H01M 4/625* (2013.01); *H01G 11/32* (2013.01); *H01M 4/131* (2013.01); *H01M 4/364* (2013.01); *H01M 4/505* (2013.01); *H01M 4/525* (2013.01); *H01M 10/0525* (2013.01); *H01G 11/34* (2013.01); *H01G 11/40* (2013.01); *H01M 2004/028* (2013.01)

(58) Field of Classification Search
CPC ...................................................... H01M 4/625
See application file for complete search history.

(56) References Cited

U.S. PATENT DOCUMENTS

| 2015/0175778 A1* | 6/2015 | Nozato | ..................... | C08F 2/44 523/218 |
| 2015/0180033 A1 | 6/2015 | Oyama et al. | | |
| 2015/0270534 A1* | 9/2015 | Nozato | ................. | H01M 4/133 429/217 |
| 2016/0006036 A1* | 1/2016 | Maruyama | ............ | H01M 4/602 429/213 |
| 2019/0190063 A1* | 6/2019 | Gogyo | .............. | H01M 10/0525 |

FOREIGN PATENT DOCUMENTS

| JP | 58-129764 A | 9/1983 |
| JP | 9-35719 A | 2/1997 |
| JP | 2004-22177 A | 1/2004 |
| JP | 2014-86228 A | 5/2014 |
| JP | 2014-197524 A | 10/2014 |
| JP | 2015-38945 A | 2/2015 |
| JP | 2016-29003 A | 3/2016 |
| WO | WO-2014/136609 A1 | 9/2014 |

OTHER PUBLICATIONS

Park, Edge-Exfoliated Graphite for Facile Kinetics of Delithiation (Year: 2012).*
International Search Report for the Application No. PCT/JP2017/030920 dated Oct. 24, 2017.
Written Opinion of the International Searching Authority (PCT/ISA/237) for Application No. PCT/JP2017/030920 dated Oct. 24, 2017.
Written Opinion of the International Searching Authority (PCT/ISA/237) for Application No. PCT/JP2017/030920 dated Oct. 24, 2017 (English Translation dated Mar. 14, 2019).
Matsuo, Y. et al., "Butyrolactone derivatives as electrolyte additives for lithium-ion batteries with graphite anodes", Journal of Power Sources, 2003, vol. 119-121, pp. 373-377.
Supplementary European Search Report for the Application No. EP 17 846 486.3 dated Jun. 12, 2020.

* cited by examiner

*Primary Examiner* — Brian R Ohara
(74) *Attorney, Agent, or Firm* — Cheng Law Group, PLLC

(57) ABSTRACT

There is provided an electrode material for electricity storage devices, which enables suppression of heat generation in charge and discharge at large currents. The electrode material for electricity storage devices comprises a first carbon material having a graphite structure wherein graphite is partially exfoliated, and a second carbon material different from the first carbon material, wherein the ratio A/B, where A represents a weight of the first carbon material and B represents a weight of the second carbon material, is within the range of 0.01 or higher and 100 or lower.

12 Claims, No Drawings

ELECTRODE MATERIAL FOR ELECTRICITY STORAGE DEVICES, ELECTRODE FOR ELECTRICITY STORAGE DEVICES, AND ELECTRICITY STORAGE DEVICE

TECHNICAL FIELD

The present invention relates to an electrode material for electricity storage devices comprising a carbon material, and an electrode for electricity storage devices and an electricity storage device using the electrode material for electricity storage devices.

BACKGROUND ART

In recent years, there has been carried out actively research and development of electricity storage devices for applications to portable devices, hybrid cars, electric cars, household electricity storage and the like.

For example, the following Patent Literature 1 discloses, as one example of electricity storage devices, a nonaqueous electrolyte secondary battery having a positive electrode containing a positive electrode active material and an electroconductive agent. Patent Literature 1 discloses that as the electroconductive agent, combined use of a flake graphite and a carbon black can improve high-rate discharge characteristics.

CITATION LIST

Patent Literature

Patent Literature 1: Japanese Patent Laid-Open No. 2004-22177

SUMMARY OF INVENTION

Technical Problem

In recent years, in the fields of hybrid cars and electric cars, electricity storage devices capable of charge and discharge at large currents have been demanded. When electricity storage devices like secondary batteries are charged and discharged at large currents, however, the electricity storage devices themselves may generate heat and cause thermal runaway. The heat generation is caused by the magnitude of the resistance of positive electrodes of the electricity storage devices.

The nonaqueous electrolyte secondary battery of Patent Literature 1 uses a flake graphite as an electroconductive agent, and since the specific surface area of the flake graphite is small, there are few contact points with the positive electrode active material. Hence, in the nonaqueous electrolyte secondary battery of Patent Literature 1, the effect of reducing the resistance of the positive electrode is small, and consequently, the heat generation in charge and discharge at large currents cannot be sufficiently suppressed.

An object of the present invention is to provide an electrode material for electricity storage devices, and an electrode for electricity storage devices and an electricity storage device using the electrode material for electricity storage devices, which all enable the heat generation in charge and discharge at large currents to be suppressed.

Solution to Problem

The electrode material for electricity storage devices according to the present invention comprises a first carbon material having a graphite structure wherein graphite is partially exfoliated, and a second carbon material different from the first carbon material, wherein the ratio A/B, where A represents the weight of the first carbon material and B represents the weight of the second carbon material, is within the range of 0.01 or higher and 100 or lower.

In a specific aspect of the electrode material for electricity storage devices according to the present invention, the ratio A/B is within the range of 0.05 or higher and 20 or lower.

In another specific aspect of the electrode material for electricity storage devices according to the present invention, the ratio A/B is within the range of 0.1 or higher and 10 or lower.

In yet another specific aspect of the electrode material for electricity storage devices according to the present invention, the ratio y/x is 0.15 or higher where y represents the amount ($\mu$mol/g) of methylene blue adsorbed per g of the first carbon material measured based on the difference in absorbance between a methanol solution of methylene blue having a concentration of 10 mg/L and a supernatant liquid obtained by placing the first carbon material in the methanol solution of methylene blue and centrifuging the mixture, and x represents the BET specific surface area ($m^2/g$) of the first carbon material.

In still another specific aspect of the electrode material for electricity storage devices according to the present invention, the ratio D/G, where the D/G ratio represents the peak intensity ratio between the D band in a Raman spectrum of the first carbon material and the G band therein, is within the range of 0.05 or higher and 0.8 or lower.

In further another specific aspect of the electrode material for electricity storage devices according to the present invention, the second carbon material is a graphene, a granular graphite compound, a fibrous graphite compound, a carbon black or an active carbon.

In further another specific aspect of the electrode material for electricity storage devices according to the present invention, the electrode material further comprises a positive electrode active material, and is a composite of the positive electrode active material, the first carbon material, and the second carbon material.

In further another specific aspect of the electrode material for electricity storage devices according to the present invention, when an X-ray diffraction spectrum of a mixture of the first carbon material and Si in a weight ratio of 1:1 is measured, the ratio c/d between the height c of the highest peak in the range of 2$\theta$ of 24° or larger and smaller than 28° and the height d of the highest peak in the range of 2$\theta$ of 28° or larger and smaller than 30° is 0.2 or higher and 1.0 or lower.

In further another specific aspect of the electrode material for electricity storage devices according to the present invention, the first carbon material and the second carbon material are electroconductive auxiliary agents to be used for a positive electrode of an electricity storage device.

In further another specific aspect of the electrode material for electricity storage devices according to the present invention, the total content of the first carbon material and the second carbon material in the electrode material for electricity storage devices is 0.2% by weight or higher and 5% by weight or lower.

The electrode for electricity storage devices according to the present invention comprises an electrode material for electricity storage devices to be configured according to the present invention.

The electricity storage device according to the present invention comprises an electrode for electricity storage devices to be configured according to the present invention.

Advantageous Effects of Invention

The present invention can provide an electrode material for electricity storage devices, which enables the heat generation in charge and discharge at large currents to be suppressed.

DESCRIPTION OF EMBODIMENTS

Hereinafter, the present invention will be described in detail.

The electricity storage device according to the present invention is not especially limited, and examples thereof include nonaqueous electrolyte primary batteries, aqueous electrolyte primary batteries, nonaqueous electrolyte secondary batteries, aqueous electrolyte secondary batteries, capacitors, electric double layer capacitors and lithium ion capacitors. The electrode material for electricity storage devices according to the present invention is an electrode material to be used for electrodes of electricity storage devices like the above. Further the electrode for electricity storage devices according to the present invention is an electrode to be used for electricity storage devices like the above.

[Electrode Material for Electricity Storage Devices]

The electrode material for electricity storage devices according to the present invention comprises a first carbon material and a second carbon material. The first carbon material has a graphite structure wherein graphite is partially exfoliated. The second carbon material is a carbon material different from the first carbon material.

In the present invention, the ratio A/B, where A represents a weight of the first carbon material and B represents a weight of the second carbon material, is within the range of 0.01 or higher and 100 or lower.

The electrode material for electricity storage devices according to the present invention, since comprising the first and second carbon materials in the above specific ratio, when being used for electricity storage devices such as secondary batteries, can suppress the heat generation in charge and discharge at large currents. Therefore, an electricity storage device using the electrode material for electricity storage devices according to the present invention is excellent in safety.

It is preferable that the electrode material for electricity storage devices according to the present invention be used as an auxiliary agent to improve electron conductivity, that is, an electroconductive auxiliary agent, in an electrode for electricity storage devices. Here, in this case, it is desirable that both the first carbon material and the second carbon material function as electroconductive auxiliary agents, and it may also be allowed that the first carbon material only functions as an electroconductive auxiliary agent.

Here, the electrode material for electricity storage devices according to the present invention may be used for a positive electrode of an electricity storage device, or may be used for a negative electrode thereof. Nevertheless, in the case where the electrode material is used for a nonaqueous electrolyte secondary battery, particularly for a lithium ion secondary battery, since by compositing the electrode material with a positive electrode active material described later, the rate characteristics and cycle characteristics of the secondary battery can be improved more, it is preferable that the electrode material be used for its positive electrode.

Further in the case where the electrode material for electricity storage devices according to the present invention is used for a positive electrode of an electricity storage device, it is preferable that the first carbon material and the second carbon material be used as electroconductive auxiliary agents of the positive electrode. In this case, since the first carbon material and the second carbon material can more enhance the electroconductivity, the content of electroconductive auxiliary agents in the positive electrode can be made low. Hence, the content of a positive electrode active material can be made higher and the capacity of the electricity storage device can be made higher.

The total content of the first carbon material and the second carbon material in 100% by weight of the electrode material for electricity storage devices is preferably 0.1% by weight or higher, more preferably 0.2% by weight or higher, and still more preferably 0.4° by weight or higher, and then preferably 10% by weight or lower, more preferably 5% by weight or lower, and still more preferably 3% by weight or lower. In the case where the total content of the first carbon material and the second carbon material is within the above range, the content of an active material can be made higher and the capacity of an electricity storage device can be made higher.

(First Carbon Material)

The first carbon material to be used in the present invention has a graphite structure wherein graphite is partially exfoliated. More specifically, one example of the structure in which "graphite is partially exfoliated" refers to a structure in which in a laminated body of graphene, the spacings between graphene layers are expanded from their edges to their insides to come extent, that is, parts of the graphite are exfoliated at its edges, and in the center-side portion thereof, the graphite layers are laminated similarly to an original graphite or primary exfoliated graphite. Therefore, portions where parts of graphite are exfoliated at its edges range to the center-side portion. Further, the first carbon material may contain exfoliated graphite produced by exfoliation of graphite at its edges.

As described above, in the first carbon material, in the center-side portion thereof, the graphite layers are laminated similarly to an original graphite or primary exfoliated graphite. Hence, the first carbon material is higher in the degree of graphitization and better in the electroconductivity than conventional graphene oxide and carbon black. Further since the first carbon material has a structure in which graphite is partially exfoliated, the specific surface area is large. Hence, for example, the area of portions contacting with a positive electrode active material can be made large. Therefore, when the electrode material for electricity storage devices comprising such a first carbon material is used for an electrode of an electricity storage device such as a secondary battery, since the resistance of the electricity storage device can be made low, the heat generation in charge and discharge at large currents can be suppressed.

Such a first carbon material can be obtained by preparing a composition containing a graphite or a primary exfoliated graphite and a resin wherein the resin is fixed to the graphite or the primary exfoliated graphite by grafting or adsorption, and pyrolyzing the composition. Here, the resin contained in the composition may be removed or may partially remain.

By the pyrolysis, the distance between graphene layers in the graphite or the primary exfoliated graphite is expanded. More specifically, in a laminated body of graphene such as the graphite or the primary exfoliated graphite, the spacings between graphene layers are expanded from their edges to their insides to some extent. That is, a structure can be obtained in which parts of the graphite are exfoliated, and in the center-side portion thereof, the graphite layers are laminated similarly to the original graphite or primary exfoliated graphite.

The graphite is a laminated body of a plurality of graphenes. As the graphite, there can be used natural graphite, artificial graphite, expanded graphite or the like. The expanded graphite has a larger layer spacing between graphene layers than usual graphite. Therefore, the expanded graphite is easily exfoliated. Hence, in the case of using the expanded graphite, the first carbon material of the present invention can more easily be obtained.

Here, the graphite has the number of laminated layers of graphene of about 100,000 to 1,000,000, and a BET specific surface area of lower than 25 $m^2/g$. Then, the primary exfoliated graphite, since being obtained by exfoliating graphite, may be one having a larger BET specific surface area than the graphite.

In the present invention, the number of laminated layers of graphene in portions where graphite is partially exfoliated in the first carbon material is preferably 5 or larger and 3,000 or smaller, more preferably 5 or larger and 1,000 or smaller, and still more preferably 5 or larger and 500 or smaller.

In the case where the number of laminated layers of graphene is smaller than the above lower limit, since the number of laminated layers of graphene in portions where graphite is partially exfoliated is small, connections cannot be made among positive electrode active materials in a positive electrode for a secondary battery as an electrode for electricity storage devices described later in some cases. Consequently, the electron conduction passages in the positive electrode are disconnected, and the rate characteristics and the cycle characteristics decrease in some cases.

In the case where the number of laminated layers of graphene is larger than the above upper limit, the size of one piece of the first carbon material becomes extremely large, and unevenness in the distribution of the carbon material in a positive electrode is produced in some cases. Hence, electron conduction passages in the positive electrode become undeveloped, and the rate characteristics and the cycle characteristics decrease in some cases.

A method of calculating the number of laminated layers of graphene is not especially limited, and the number can be calculated by visual observation using TEM or the like.

In the first carbon material to be used in the present invention, with the peak intensity ratio between the D band and the G band in a Raman spectrum acquired by Raman spectroscopy being expressed as a D/G ratio, the D/G ratio is preferably 0.8 or lower, and more preferably 0.7 or lower. The case where the D/G ratio is in this range can more enhance the electroconductivity of the first carbon material itself, and also can more reduce the amount of gasses generated. Then, the D/G ratio is preferably 0.05 or higher. The case where the D/G ratio is equal to or higher than the above lower limit, when the first carbon material is used for an electrode of an electricity storage device such as a secondary battery, can more suppress a decomposition reaction of an electrolyte solution. Consequently, the cycle characteristics can be improved more.

The BET specific surface area of the first carbon material to be used in the present invention is preferably 25 $m^2/g$ or larger in that contact points with a positive electrode active material can be secured more sufficiently. The BET specific surface area of the first carbon material is more preferably 35 $m^2/g$ or larger, still more preferably 45 $m^2/g$ or larger, and especially preferably 90 $m^2/g$ or larger, in that contact points with a positive electrode active material can be secured still more sufficiently. Then, from the viewpoint of more enhancing easy handleability in fabrication of a positive electrode, the BET specific surface area of the first carbon material is preferably 2,500 $m^2/g$ or smaller.

In the first carbon material to be used in the present invention, the ratio y/x, where y represents an amount (μmol/g) of methylene blue adsorbed per g of the first carbon material and x represents a BET specific surface area ($m^2/g$) of the first carbon material, is preferably 0.15 or higher, and more preferably 0.15 or higher and 1.0 or lower. Further the ratio y/x is still more preferably 0.2 or higher and 0.9 or lower in that the adsorption of a positive electrode active material by the first carbon material more easily progresses in preparation of a slurry described later.

The amount (μmol/g) of methylene blue adsorbed is measured as follows. First, the absorbance (blank) of a methanol solution of methylene blue in a concentration of 10 mg/L is measured. Then, a measurement subject is placed in the methanol solution of methylene blue, and the absorbance (sample) of a supernatant liquid obtained by centrifugation is measured. Finally, the amount (μmol/g) of methylene blue adsorbed per g of the first carbon material is calculated from a difference between the absorbance (blank) and the absorbance (sample).

Here, the amount of methylene blue adsorbed and the BET specific surface area of the first carbon material have a correlation. Conventionally known globular graphite particles have the relation y≈0.13x where x represents a BET specific surface area ($m^2/g$) and y represents the amount (μmol/g) of methylene blue adsorbed. This indicates that a larger BET specific surface area gives a larger amount of methylene blue adsorbed. Therefore, the amount of methylene blue adsorbed can become an index as an alternative to the BET specific surface area.

In the present invention, as described above, the ratio y/x of the first carbon material is preferably 0.15 or higher. By contrast, in conventional globular graphite particles, the ratio y/x is 0.13. Therefore, in the case where the ratio y/x is 0.15 or higher, the first carbon material has a larger amount of methylene blue adsorbed than conventional globular graphite particles, though having the same BET specific surface area. That is, in this case, although the first carbon material somewhat condenses in a dry state, in a wet state such as in methanol, the spacings between graphene layers or graphite layers can be more expanded than in a dry state.

The first carbon material to be used in the present invention can be obtained by being subjected to a step of fabricating a composition in which a resin is fixed on a graphite or a primary exfoliated graphite by grafting or adsorption, and then to a step of pyrolyzing the composition. Here, the resin contained in the composition may be removed or may partially remain.

The amount of the resin in the case where the resin remains in the first carbon material is, with respect to 100 parts by weight of the first carbon material excluding the resin content, preferably 1 part by weight or larger and 350 parts by weight or smaller, more preferably 5 parts by weight or larger and 50 parts by weight or smaller, and still more preferably 5 parts by weight or larger and 30 parts by weight or smaller. When the amount of the residual resin is smaller than the lower limit, the BET specific surface area cannot be secured in some cases. Further in the case where the amount of the residual resin is larger than the upper limit, the production cost increases in some cases.

Here, the amount of the resin remaining in the first carbon material can be calculated, for example, by measuring the change in weight accompanied by the heating temperature by thermogravimetric analysis (hereinafter, TG).

In the first carbon material to be used in the present invention, the resin may be removed after a composite thereof with a positive electrode active material is fabricated. A method of removing the resin is preferably a method which carries out a heat treatment at a temperature equal to or higher than the decomposition temperature of the resin and lower than the decomposition temperature of the positive electrode active material. The heat treatment may be carried out in any of the air, an inert gas atmosphere, a low-oxygen atmosphere and vacuum.

The resin to be used for fabrication of a composition in which the resin is fixed on a graphite or a primary exfoliated graphite by grafting or adsorption is not especially limited, and is preferably a polymer of a radically polymerizable monomer. The polymer may be a copolymer of a plurality of radically polymerizable monomers, or may be a homopolymer of one kind of radically polymerizable monomer.

Examples of such a resin include polypropylene glycol, polyglycidyl methacrylate, polyvinyl acetate, polybutyral, polyacrylic acid and polyethylene glycol.

Examples of methods of producing the first carbon material include a production method described in International Publication No. WO2014/034156. That is, the first carbon material to be used in the present invention is fabricated, for example, by carrying out a step of fabricating a composition containing a graphite or a primary exfoliated graphite, and a resin, and a step of pyrolyzing the fabricated composition (in an open system). The produced first carbon material has a graphite structure wherein graphite is partially exfoliated.

In the above production method, since an oxidation step is not carried out, the obtained first carbon material is better in the electroconductivity than conventional graphene oxide or graphene obtained by reducing the graphene oxide. This is conceivably because the conventional graphene oxide or reduced graphene oxide cannot sufficiently secure the $sp^2$ structure. An electrode material for electricity storage devices using the first carbon material, since being better in the electroconductivity than conventional graphene oxide or reduced graphene oxide, when being used for an electrode of an electricity storage device such as a secondary battery, can make the resistance of the electricity storage device low, and can suppress the heat generation in charge and discharge at large currents. Further the obtained first carbon material, since having few active points on the surface, more hardly decomposes an electrolyte solution than graphene oxide. Hence, in the case of using the obtained first carbon material, the generation of gases can also be suppressed.

In the present invention, when an X-ray diffraction spectrum of a mixture of the first carbon material and Si in a weight ratio of 1:1 is measured, it is preferable that the ratio c/d between a height c of the highest peak in the range of 2θ of 24° or larger and smaller than 28° and a height d of the highest peak in the range of 2θ of 28° or larger and smaller than 30° be in the following range. That is, the ratio c/d is preferably 0.2 or higher and 1.0 or lower. Here, the above Si usable is, for example, a silicon powder of φ=100 nm or smaller.

The X-ray diffraction spectrum can be measured by wide-angle X-ray diffractometry. As the X-rays, the CuKα line (wavelength: 1.541 Å) can be used. As an X-ray diffractometer, for example, a SmartLab (manufactured by Rigaku Corp.) can be used.

In the X-ray diffraction spectrum, the peak originated from a graphene laminating structure represented by the graphite structure emerges nearly at 2θ=26.4°. On the other hand, the peak originated from Si such as silicon powder emerges nearly at 2θ=28.5°. Therefore, the above ratio c/d can be determined from a ratio between a peak height of the peak nearly at 2θ=26.4° and that of the peak nearly at 2θ=28.5° (the peak nearly at 2θ=26.4°/the peak nearly at 2θ=28.5°).

Here, in the case where the ratio c/d is lower than 0.2, since the formation of the graphite structure in the first carbon material itself is undeveloped, and the electron conductivity is low and additionally, the structure has defects, the resistance values of a positive electrode and a negative electrode increase and the battery characteristics decrease in some cases.

In the case where the ratio c/d is higher than 1.0, the first carbon material itself becomes rigid and becomes difficult to disperse in a positive electrode and a negative electrode of an electricity storage device, making it difficult for satisfactory electron conduction passages to be formed in some cases.

From the viewpoint of making it easier for electron conduction passages to be formed in an electrode of an electricity storage device, the ratio c/d is more preferably 0.22 or higher and still more preferably 0.25 or higher, and then more preferably 0.9 or lower and still more preferably 0.8 or lower.

(Second Carbon Material)

The second carbon material to be used in the present invention is a carbon material different from the first carbon material. The second carbon material is not especially limited, and examples thereof include graphene, artificial graphite, granular graphite compounds, fibrous graphite compounds, carbon black and active carbon.

The graphene may be graphene oxide or may be reduced graphene oxide.

The granular graphite compound is not especially limited, and examples thereof include natural graphite, artificial graphite and expanded graphite.

The fibrous graphite compound is not especially limited, and examples thereof include carbon nanohorns, carbon nanotubes and carbon fibers.

The carbon black is not especially limited, and examples thereof include furnace black, Ketjen black and acetylene black.

The BET specific surface area of the second carbon material is preferably 5 m$^2$/g or larger in that the retainability of an electrolyte solution of an electricity storage device such as a secondary battery becomes better. From the viewpoint of more enhancing the retainability of the electrolyte solution of the electricity storage device, the BET specific surface area of the second carbon material is more preferably 10 m$^2$/g or larger, and still more preferably 25 m$^2$/g or larger. Further from the viewpoint of more enhancing easy handleability in fabrication of a positive electrode, the BET specific surface area of the second carbon material is preferably 2,500 m$^2$/g or smaller.

The first carbon material and the second carbon material can be distinguished, for example, by SEM, TEM or the like.

Here, comprising the first carbon material and the second carbon material suffices, for example, if the above-mentioned first carbon material and second carbon material are present in a composite described later or a positive electrode. A method of making the first carbon material and the second carbon material present is not especially limited, and may involve mixing them in fabrication of a composite described later or a positive electrode, or may involve fabricating a composite described later of one of the carbon materials and thereafter adding the other carbon material.

The second carbon material may have functional groups on the surface in that easiness of fabrication of a composite described later or a positive electrode is improved.

With respect to the first carbon material and the second carbon material to be used in the present invention, the ratio A/B, where A represents a weight of the first carbon material and B represents a weight of the second carbon material, is within the range of 0.01 or higher and 100 or lower.

In the case where the ratio A/B is within the above range, the resistance of an electrode in an electricity storage device such as a secondary battery can be made low. Hence, when the first carbon material and the second carbon material are used in an electricity storage device, the heat generation in charge and discharge at large currents can be suppressed.

From the viewpoint of making the resistance of an electrode in an electricity storage device lower, the ratio A/B is preferably 0.05 or higher and more preferably 0.1 or higher, and then preferably 20 or lower and more preferably 10 or lower. The ratio A/B is still more preferably 1.0 or higher, and then still more preferably 8.0 or lower, in that the decrease in the capacity of an electricity storage device during its continuous operation can be suppressed more.

(Positive Electrode Active Material)

The electrode material for electricity storage devices according to the present invention may further comprise a positive electrode active material. The positive electrode active material can be used, as described later, as a composite (active material-carbon material composite) with the first and second carbon materials. Here, in this case, it is desirable that an electricity storage device be a nonaqueous electrolyte secondary battery, particularly a lithium ion secondary battery.

Examples of the positive electrode active material include compounds in which an intercalation reaction and a deintercalation reaction of alkali metal ions or alkaline earth metal ions progress. Examples of the alkali metal ions include lithium ions, sodium ions, and potassium ions. Examples of the alkaline earth metal ions include calcium ions and magnesium ions.

The compounds in which an intercalation reaction and a deintercalation reaction of lithium ions progress include, particularly, lithium transition metal composite oxides having a layered rock salt-type structure, lithium transition metal composite oxides having a spinel structure, and mixtures thereof.

The lithium transition metal composite oxides having a layered rock salt-type structure are compounds represented by the following formula (1).

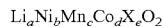   Formula (1)

wherein X is at least one selected from B, Mg, Al, Si, Ti, V, Cr, Fe, Cu, Zn, Ga, Ge, Sr, Zr, Nb, Mo, In and Sn; and a, b, c, d and e are within the ranges of 0<a≤1.2, 0≤b≤1, 0≤c≤1, 0≤d<1, 0≤e≤1, and b+c+d+e=1.

In the case of a≤0, the compound does not function as a positive electrode active material; on the other hand, in the case of a>1.2, the compound may contain many impurities such as lithium carbonate. In the case of b>1, c>1, e>1 or d≥1, the stability of the positive electrode active material tends to decrease.

As the lithium transition metal composite oxides having a layered rock salt-type structure, in that the stability of the active material itself is enhanced more, preferable is a lithium transition metal composite oxides having a layered rock salt-type structure represented by $Li_aNi_bMn_cCo_dO_2$ (wherein a, b, c and d are within the ranges of 0<a≤1.2, 0<b<1, 0<c<1, 0<d<1, and b+c+d=1), $Li_aNi_bMn_cO_2$ (wherein a, b and c are within the ranges of 0<a≤1.2, 0<b<1, 0<c<1, and b+c=1), $Li_aNi_bCo_dAl_eO_2$ (wherein a, b, d and e are within the ranges of 0<a≤1.2, 0<b<1, 0<d<1, 0<e<1, and b+d+e=1), $Li_aNi_bX_eO_2$ (wherein a, b and e are within the ranges of 0<a≤1.2, 0<b<1, 0<e<1, and b+e=1), $Li_aMn_cX_eO_2$ (wherein a, c and e are within the ranges of 0<a≤1.2, 0<c<1, 0<e<1, and c+e=1), or $Li_aCo_dX_eO_2$ (wherein a, d and e are within the ranges of 0<a≤1.2, 0<d<1, 0<e<1, and d+e=1).

Further in that the stability of the active material itself is much better and the production is easier, especially preferable is one lithium transition metal composite oxide having a layered rock salt-type structure selected from $LiNi_{1/3}Mn_{1/3}Co_{1/3}O_2$, $LiNi_{0.5}Mn_{0.3}Co_{0.2}O_2$, $LiNi_{0.5}Mn_{0.5}O_2$, $LiNi_{0.4}Mn_{0.4}Co_{0.2}O_2$, $LiNi_{0.1}Mn_{0.1}Co_{0.8}O_2$, $LiNi_{0.8}Co_{0.16}Al_{0.04}I_2$, $LiNi_{0.8}Co_{0.15}Al_{0.05}O_2$, $LiNi_{0.08}Ci_{0.01}Al_{0.01}O_2$, $LiNiO_2$, $LiMnO_2$, and $LiCo_dX_eO_2$ (wherein d and e are within the ranges of 0<d<1, 0<e<1, and d+e=1).

These lithium transition metal composite oxides having a layered rock salt-type structure may be doped further with a same element as the above X or an element different therefrom. Further the composite oxides in which the a is larger than 1, that is, so-called lithium-rich ones, are included in the present invention.

The lithium transition metal composite oxides having a spinel structure are compounds represented by the following formula (2).

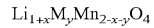   Formula (2)

wherein x and y are within the ranges of 0≤x≤0.2 and 0≤y≤0.6; and M is at least one or more elements selected from the group consisting of elements (excluding Mn) belonging to groups 2 to 13 in periods 3 and 4 in periodic table.

From the viewpoint of making the effect of improving the stability of the positive electrode active material itself larger, M in $Li_{1+x}M_yMn_{2-x-y}O_4$ is preferably Al, Mg, Zn, Co, Fe, Ti, Cu, Ni or Cr, and more preferably Al, Mg, Zn, Ti, Ni or Cr. Further from the viewpoint of making the effect of improving the stability of the positive electrode active material itself much larger, the M is still more preferably Al, Mg, Zn, Ni or Ti. Here, M may be one kind or maybe two or more kinds.

x in $Li_{1+x}M_yMn_{2-x-y}O_4$ is 0≤x≤0.2. In the case of x<0, the capacity of the positive electrode active material reduces in some cases. On the other hand, in the case of x>0.2, many impurities such as lithium carbonate are contained in some cases.

y in $Li_{1+x}M_yMn_{2-x-y}O_4$ is 0≤y≤0.6, and preferably 0<y<0.6. In the case of y=0, the stability of the positive electrode active material decreases in some cases. On the other hand, in the case of y>0.6, many impurities such as oxides of M are contained in some cases.

Among these spinel-type lithium transition metal composite oxides (having a spinel structure), in that combinations thereof with nonaqueous electrolytes described later have larger effects of reduction of the gas generation and making the charge end voltage high, preferable is $Li_{1+x}Al_yMn_{2-x-y}O_4$ (0≤x≤0.1, 0<y≤0.1), $Li_{1+x}Mg_yMn_{2-x-y}O_4$ (0≤x≤0.1, 0<y≤0.1) $Li_{1+x}Zn_yMn_{2-x-y}O_4$ (0≤x≤0.1, 0<y≤0.1), $Li_{1+x}Cr_yMn_{2-x-y}O_4$ (0≤x≤0.1, 0<y≤0.1), or $Li_{1+x}Ni_yMn_{2-x-y}O_4$ (0≤x≤0.1, 0<y≤0.6). In that combinations thereof with nonaqueous electrolytes described later have much larger effects of reduction of the gas generation and making the charge end voltage high, more preferable is $Li_{1+x}Al_yMn_{2-x-y}O_4$ ($0 \leq x \leq 0.1$, $0<y \leq 0.1$), $Li_{1+x}Mg_yMn_{2-x-y}O_4$ ($0 \leq x \leq 0.01$, $0<y \leq 0.01$), or $Li_{1+x}Ni_yMn_{2-x-y}O_4$ ($0 \leq x \leq 0.01$, $0<y \leq 0.6$).

The particle diameters of the lithium transition metal composite oxide having a layered rock salt-type structure and the lithium transition metal composite oxide having a spinel structure (lithium manganate) are each preferably 0.1 µm or larger and 50 µm or smaller. Further from the viewpoint of more enhancing the handleability, the particle diameter of the lithium transition metal composite oxides is more preferably 0.5 µm or larger and 30 µm or smaller. Here, the particle diameter is a value acquired by measuring the size of each particle from a SEM or TEM image and calculating an average particle diameter thereof. Here, the particles may be primary particles or may be granules obtained by aggregating primary particles.

The specific surface areas of the lithium transition metal composite oxide having a layered rock salt-type structure and the lithium transition metal composite oxide having a spinel structure (lithium manganate) are each preferably 0.1 m²/g or larger and 50 m²/g or smaller, in that a desired output density is more easily attained. Here, the specific surface area can be calculated by measurement by the BET method.

Only one of the lithium transition metal composite oxide having a layered rock salt-type structure and the lithium transition metal composite oxide having a spinel structure may be used or a mixture of the both thereof may be used. Further there may be used a mixture of two or more of the lithium transition metal composite oxides having a layered rock salt-type structure (or the lithium transition metal composite oxides having a spinel structure) having different compositions and particle diameters.

The fabrication of the mixture is not especially limited and may involve fabricating the mixture before fabrication of a composite with the first and second carbon materials as described later, or mixing corresponding positive electrode active materials in the fabrication time of a composite with the first and second carbon materials as described later, or mixing each fabricated composite of a corresponding positive electrode active material with the first and second carbon materials.

The method of fabricating the mixture before fabrication of a composite with the first and second carbon materials as described later, and the method of mixing each fabricated composite of a corresponding positive electrode active material with the first and second carbon materials as described later are not especially limited, and can be carried out, for example, by using a mixer such as a mortar, a planetary mixer, a disperser, a thin-film spin system mixer, a jet mixer or a planetary centrifugal mixer. Examples of the method of mixing corresponding positive electrode active materials in the fabrication time of a composite with the first and second carbon materials as described later include a method of adding the corresponding positive electrode active materials in the fabrication time of a composite with the first and second carbon materials.

Then, it is preferable that the positive electrode active materials to be used in the present invention satisfy a relation of $0.01 \leq X/(X+Y) \leq 0.99$ where X represents a weight of the lithium transition metal composite oxide having a layered rock salt-type structure, and Y represents a weight of the lithium transition metal composite oxide having a spinel structure (lithium manganate). In the case where the $X/(X+Y)$ is not within the above range, the stability decreases in some cases.

From the viewpoint of more improving the rate characteristics, the $X/(X+Y)$ is more preferably $0.03 \leq X/(X+Y) \leq 0.97$. Further in addition to the above effect, from the viewpoint of more enhancing an effect of absorbing generated gases, the $X/(X+Y)$ is still more preferably $0.05 \leq X/(X+Y) \leq 0.95$.

(Active Material-Carbon Material Composite)

An active material-carbon material composite, which is a composite of the positive electrode active material with the first and second carbon materials, is fabricated, for example, by the following procedure.

First, a dispersion liquid 1 (hereinafter, a dispersion liquid 1 of the first carbon material) in which the above-mentioned first carbon material which has a graphite structure wherein graphite is partially exfoliated is dispersed in a solvent is fabricated. Then, separately from the dispersion liquid 1, a dispersion liquid 2 (hereinafter, a dispersion liquid 2 of the second carbon material) of the second carbon material which is a carbon material different from the first carbon material is fabricated. Then, separately from the dispersion liquids 1 and 2, a dispersion liquid of the positive electrode active material (hereinafter, a dispersion liquid of the positive electrode active material) in which the positive electrode active material is dispersed in a solvent is fabricated.

Then, the dispersion liquid 2 of the second carbon material and the dispersion liquid of the positive electrode active material are mixed, and further the dispersion liquid 1 of the first carbon material is mixed in the mixed dispersion liquid. Finally, by removing the solvents of the dispersion liquid containing the first and second carbon materials and the positive electrode active material, a composite of the positive electrode active material with the first carbon material and the second carbon material (active material-carbon material composite), which is used for a positive electrode for a secondary battery as the electrode for electricity storage devices according to the present invention is fabricated.

Besides the above-mentioned fabrication method, there may also be a method in which the order of mixing is changed, a method in which one of the dispersion liquids 1 and 2 is not a dispersion liquid but is in a dry state, or a method in which the all in dry states are mixed. Further, there may be a method of mixing, by a mixer, a mixture of the first carbon material, the second carbon material, the positive electrode active material and a solvent, that is, the fabrication of a slurry of a positive electrode as described later and the fabrication of a composite may be performed at the same time.

A solvent for dispersing the positive electrode active material, the first carbon material or the second carbon material may be an aqueous solvent, a nonaqueous solvent, a mixed solvent of an aqueous solvent with a nonaqueous solvent, or a mixed solvent of different nonaqueous solvents. Then, a solvent for dispersing the first and second carbon materials and a solvent for dispersing the positive electrode active material may be the same or different. In the case where the solvents are different, it is preferable that the solvents have compatibility with each other.

The nonaqueous solvent is not especially limited, and for example, from the viewpoint of easy dispersibility, there can be used an alcoholic solvent represented by methanol, ethanol and propanol, or solvent such as tetrahydrofuran or N-methyl-2-pyrrolidone. Further in order to more improve the dispersibility, dispersants such as surfactants may be contained in the solvent.

A dispersing method is not especially limited, and includes methods of dispersing by ultrasonic waves, by a mixer, by a jet mill, or by a stirring bar.

The solid content concentrations of the dispersion liquids of the first carbon material and the second carbon material (hereinafter, these carbon materials are generically called the carbon materials in some cases) are each not especially limited, and with the weight of the carbon material being taken to be 1, the weight of the solvent is preferably 0.5 or larger and 1,000 or smaller. From the viewpoint of more enhancing the handleability, with the weight of the carbon material being taken to be 1, the weight of the solvent is more preferably 1 or larger and 750 or smaller. Further from the viewpoint of more enhancing the dispersibility, with the weight of the carbon material being taken to be 1, the weight of the solvent is still more preferably 2 or larger and 500 or smaller.

In the case where the weight of the solvent is smaller than the above lower limit, the carbon material cannot be dispersed to a desired disperse state in some cases. On the other hand, in the case where the weight of the solvent is larger than the above upper limit, the production cost increases in some cases.

The solid content concentration of the dispersion liquid of the positive electrode active material is not especially limited, and in the case where the weight of the positive electrode active material is taken to be 1, the weight of the solvent is preferably 0.5 or larger and 100 or smaller. From the viewpoint of more enhancing the handleability, the weight of the solvent is more preferably 1 or larger and 75 or smaller. Further from the viewpoint of more enhancing the dispersibility, the weight of the solvent is still more preferably 5 or larger and 50 or smaller. In the case where the weight of the solvent is smaller than the above lower limit, there is a case where the positive electrode active material cannot be dispersed to a desired disperse state. On the other hand, in the case where the weight of the solvent is larger than the above upper limit, the production cost increases in some cases.

A method of mixing a dispersion liquid of the positive electrode active material and a dispersion liquid of the carbon material is not especially limited, and includes a method of mixing both the dispersion liquids at one time, and a method of adding one of the dispersion liquids to the other thereof in several times.

Examples of the method of adding one of the dispersion liquids to the other thereof in several times include a method of dropping by using a dropping implement such as a syringe, a method of using a pump, and a method of using a dispenser.

A method of removing solvents from the mixture of the carbon materials, the positive electrode active material and the solvents is not especially limited, and includes a method of removing the solvents by filtration and thereafter drying the resultant by an oven or the like. It is preferable from the viewpoint of more enhancing the productivity that the filtration be suction filtration. Then it is preferable that the drying method involve drying in an air-blast oven and thereafter drying under vacuum, because the solvents remaining in pores can be removed.

With respect to the ratio between the weight of the positive electrode active material and the total weight of the first and second carbon materials (hereinafter, defined as the weight of the carbon materials) in the active material-carbon material composite of the present invention, the weight of the carbon materials is, with the weight of the positive electrode active material being taken to be 100, preferably 0.2 or larger and 10.0 or smaller. From the viewpoint of more improving the rate characteristics described later, the weight of the carbon materials is more preferably 0.3 or larger and 8.0 or smaller. Further from the viewpoint of more improving the cycle characteristics, the weight of the carbon materials is still more preferably 0.5 or larger and 7.0 or smaller.

From the viewpoint of more increasing the capacity of an electricity storage device, the ratio between the weight of the carbon materials and the weight of the positive electrode active material is preferably 0.002 or higher, more preferably 0.003 or higher and still more preferably 0.005 or higher, and then preferably 0.1 or lower, more preferably 0.07 or lower, still more preferably 0.05 or lower, and most preferably 0.03 or lower. Here, the weight of the carbon materials is a total weight of the first and second carbon materials. Further the ratio is (weight of the carbon materials)/(weight of the positive electrode active material).

[Electrode for Electricity Storage Devices]

The electrode for electricity storage devices according to the present invention comprises the above electrode material for electricity storage devices. Hence, when the electrode is used for an electricity storage device such as a secondary battery, the heat generation in charge and discharge at large currents can be suppressed.

It is desirable that the electrode for electricity storage devices according to the present invention be a positive electrode for a secondary battery comprising the positive electrode active material, the first carbon material and the second carbon material. The positive electrode for a secondary battery as one example of the electrode for electricity storage devices according to the present invention may be formed only of the positive electrode active material, the first carbon material and the second carbon material, and from the viewpoint of more easily forming the positive electrode, may contain a binder. Further there may be used the above-mentioned active material-carbon material composite, which is a composite of the positive electrode active material, the first carbon material and the second carbon material.

The binder is not especially limited, and there can be used, for example, at least one resin selected from the group consisting of polyvinylidene fluoride (PVdF), polytetrafluoroethylene (PTFE), styrene-butadiene rubber, polyimide and derivatives thereof.

It is preferable from the viewpoint of more easily fabricating the positive electrode for a secondary battery that the binder be dissolved or dispersed in a nonaqueous solvent or water.

The nonaqueous solvent is not especially limited, and examples thereof include N-methyl-2-pyrrolidone (NMP), dimethylformamide, dimethylacetamide, methyl ethyl ketone, methyl acetate, ethyl acetate and tetrahydrofuran. A dispersant and a thickener may be added thereto.

The amount of the binder contained in the positive electrode for a secondary battery is, with respect to 100 parts by weight of the positive electrode active material, preferably 0.3 part by weight or larger and 30 parts by weight or smaller and more preferably 0.5 part by weight or larger and 15 parts by weight or smaller. In the case where the amount of the binder is within the above range, the adhesivity of the positive electrode active material with the first and second carbon materials can be maintained and the adhesivity with a current collector can be enhanced more.

Examples of a method of fabricating the positive electrode for a secondary battery include a method of forming a mixture of the positive electrode active material, the first and second carbon materials and the binder on a current collector to thereby fabricate the positive electrode.

It is preferable from the viewpoint of more easily fabricating the positive electrode for a secondary battery that the positive electrode be fabricated as follows. First, a binder solution or dispersion liquid is added to the positive electrode active material and the first and second carbon materials to thereby fabricate a slurry. Then, the fabricated slurry is applied on a current collector, and finally, the solvent is removed to thereby fabricate the positive electrode for a secondary battery.

As a method of fabricating the slurry, a well-known method can be used. Examples of the method include a method of mixing by using a mixer or the like. The mixer to be used for the mixing is not especially limited, and includes a planetary mixer, a disperser, a thin-film spin system mixer, a jet mixer and a planetary centrifugal mixer.

The solid content concentration of the slurry is, from the viewpoint of more easily carrying out coating described later, preferably 30% by weight or higher and 95% by weight or lower. From the viewpoint of more enhancing the storage stability, the solid content concentration of the slurry is more preferably 35% by weight or higher and 90% by weight or lower. Further from the viewpoint of more suppressing the production cost, the solid content concentration of the slurry is still more preferably 40% by weight or higher and 85% by weight or lower.

Here, the solid content concentration can be controlled by a diluting solvent. It is preferable that the diluting solvent to be used be the same solvent as in the binder solution or dispersion liquid. Further other solvents may be used as long as having compatibility therewith.

It is preferable that a current collector to be used for the positive electrode for a secondary battery be aluminum or an alloy containing aluminum. The aluminum, since being stable in the positive electrode reaction atmosphere, is not especially limited, and is preferably a high-purity aluminum represented by JIS standards 1030, 1050, 1085, 1N90, 1N99 and the like.

The thickness of the current collector is not especially limited, and is preferably 10 μm or larger and 100 μm or smaller. In the case where the thickness of the current collector is smaller than 10 μm, from the viewpoint of the fabrication, the handling becomes difficult in some cases. On the other hand, in the case where the thickness of the current collector is larger than 100 μm, from the viewpoint of the economic efficiency, it becomes disadvantageous in some cases.

Here, the current collector may be a current collector in which the surface of a metal other than aluminum (copper, SUS, nickel, titanium or an alloy thereof) is coated with aluminum.

A method of applying the slurry on the current collector is not especially limited, and examples thereof include a method in which the slurry is applied by a doctor blade, a die coater, a comma coater or the like and thereafter, a solvent is removed, a method in which the slurry is applied by spraying and thereafter, the solvent is removed, and a method in which the slurry is applied by screen printing and thereafter, the solvent is removed.

It is preferable that a method of removing the solvent involve drying by using an air-blast oven or a vacuum oven, since being simpler. The atmosphere in which the solvent is removed includes an air atmosphere, an inert gas atmosphere, and a vacuum state. Then, the temperature at which the solvent is removed is not especially limited, and is preferably 60° C. or higher and 250° C. or lower. When the temperature at which the solvent is removed is lower than 60° C., removing the solvent takes much time in some cases. On the other hand, when the temperature at which the solvent is removed is higher than 250° C., the binder deteriorates in some cases.

The positive electrode for a secondary battery may be compressed to a desired thickness and density. The compression is not especially limited, and can be carried out, for example, by using a roll press, a hydraulic press or the like.

The thickness of the positive electrode for a secondary battery after the compression is not especially limited, and is preferably 10 μm or larger and 1,000 μm or smaller. With the thickness being smaller than 10 μm, a desired capacity cannot be attained in some cases. On the other hand, in the case where the thickness is larger than 1,000 μm, it is difficult to attain a desired output density in some cases.

The density of the positive electrode for a secondary battery is preferably 1.0 $g/cm^3$ or higher and 4.0 $g/cm^3$ or lower. With the density being lower than 1.0 $g/cm^3$, the contact of the positive electrode active material with the first and second carbon materials becomes insufficient and the electron conductivity decreases in some cases. On the other hand, with the density being higher than 4.0 $g/cm^3$, it becomes difficult for an electrolyte solution described later to permeate into the positive electrode and the lithium ion conductivity decreases in some cases.

In the positive electrode for a secondary battery, the electric capacity per $cm^2$ of the positive electrode is preferably 0.5 mAh or higher and 10.0 mAh or lower. In the case where the electric capacity is lower than 0.5 mAh, the size of the battery having a desired capacity becomes large in some cases. On the other hand, in the case where the electric capacity is higher than 10.0 mAh, it becomes difficult to attain a desired output density in some cases. Here, the calculation of the electric capacity per $cm^2$ of the positive electrode may be made by fabricating a half cell with lithium metal as a counter electrode after fabrication of the positive electrode for a secondary battery, and measuring charge and discharge characteristics.

The electric capacity per $cm^2$ of the positive electrode for a secondary battery is not especially limited, and can be controlled by the weight of the positive electrode formed on per unit area of the current collector. The electric capacity can be controlled, for example, by the thickness of the coating with the slurry in the coating time thereof described before.

[Electricity Storage Device]

The electricity storage device according to the present invention has the electrode for electricity storage devices according to the present invention. Hence, the heat generation in charge and discharge at large currents can be suppressed.

As described above, the electricity storage device according to the present invention is not especially limited, and examples thereof include nonaqueous electrolyte primary batteries, aqueous electrolyte primary batteries, nonaqueous electrolyte secondary batteries, aqueous electrolyte secondary batteries, capacitors, electric double layer capacitors, and lithium ion capacitors.

A secondary battery as one example of the electricity storage device according to the present invention suffices if using a compound progressing the intercalation reaction and deintercalation reaction of alkali metal ions or alkaline earth metal ions. Examples of the alkali metal ions include lithium ions, sodium ions and potassium ions. Examples of the alkaline earth metal ions include calcium ions and magnesium ions.

Particularly, the present invention has a large effect on positive electrodes of nonaqueous electrolyte secondary batteries, and among these, is suitable for ones using lithium ions. Hereinafter, descriptions will be made by taking, as an example, nonaqueous electrolyte secondary batteries using lithium ions (hereinafter, lithium ion secondary batteries).

A positive electrode and a negative electrode of the nonaqueous electrolyte secondary battery may be a form in which the same electrodes are formed on both surfaces of a current collector, or may be a form in which a positive electrode is formed on one surface of a current collector and a negative electrode is formed on the other surface thereof, that is, a bipolar electrode.

The nonaqueous electrolyte secondary battery may be one in which a separator is disposed between the positive electrode side and the negative electrode side and the resultant may be wound or laminated. A nonaqueous electrolyte bearing lithium ion conduction is contained in the positive electrode, the negative electrode and the separator.

The nonaqueous electrolyte secondary battery, after the above laminated body is wound, or a plurality thereof are laminated, may be armored with a laminate film, or may be armored with a metal can of a rectangular shape, an oval shape, a cylindrical shape, a coin shape, a button shape or a sheet shape. The armor may have a mechanism to discharge generated gases. The number of laminating of the laminated bodies is not especially limited, and laminating can be made until a desired voltage value and battery capacity are developed.

The nonaqueous electrolyte secondary batteries can be made into an assembled battery in which the secondary batteries are suitably connected in series or in parallel according to a desired size, capacity and voltage. It is preferable for checking the charge state of each battery and improving the safety that the assembled battery has a control circuit attached thereto.

(Positive Electrode)

The nonaqueous electrolyte secondary battery has, as its positive electrode, a positive electrode for a secondary battery constituted according to the present invention. The positive electrode for a secondary battery comprises an electrode material for a secondary battery constituted according to the present invention. Therefore, the nonaqueous electrolyte secondary battery can suppress the heat generation in charge and discharge at large currents. Therefore, a secondary battery using the electrode material for a secondary battery is excellent in safety.

(Negative Electrode)

A negative electrode to be used for the nonaqueous electrolyte secondary battery is not especially limited, and examples thereof include electrodes using natural graphite, artificial graphite, hard carbon, metal oxides, lithium titanate, and silicon-based or other negative electrode active materials.

(Separator)

A separator to be used for the nonaqueous electrolyte secondary battery is installed between the positive electrode and the negative electrode described before, and suffices as long as having a structure which is insulative and can contain a nonaqueous electrolyte described later. Examples of the materials of the separator include woven fabrics, nonwoven fabrics and macroporous membranes of nylon, cellulose, polysulfone, polyethylene, polypropylene, polybutene, polyacrylonitrile, polyimide, polyamide, polyethylene terephthalate or composites of two or more thereof.

The separator may contain various types of plasticizers, antioxidants and flame retardants, and may be coated with a metal oxide or the like.

The thickness of the separator is not especially limited, and is preferably 5 μm or larger and 100 μm or smaller. In the case where the thickness of the separator is smaller than 5 μm, the positive electrode and the negative electrode contact each other in some cases. In the case where the thickness of the separator is larger than 100 μm, the resistance of the battery becomes high in some cases. From the viewpoint of more improving the economic efficiency and the handleability, the thickness of the separator is more preferably 10 μm or larger and 50 μm or smaller.

(Nonaqueous Electrolyte)

A nonaqueous electrolyte to be used for the nonaqueous electrolyte secondary battery is not especially limited, and there can be used a gel electrolyte in which a polymer is impregnated with an electrolyte solution in which a solute is dissolved in a nonaqueous solvent, a polymer solid electrolyte such as polyethylene oxide or polypropylene oxide, or an inorganic solid electrolyte such as a sulfide glass or an oxynitride.

It is preferable that the nonaqueous solvent contain a cyclic aprotic solvent and/or an acyclic aprotic solvent, because more easily dissolving a solute described later. Examples of the cyclic aprotic solvent include cyclic carbonates, cyclic esters, cyclic sulfones and cyclic ethers. Examples of the acyclic aprotic solvent include acyclic carbonates, acyclic carboxylate esters and acyclic ethers. Further in addition to the above, there may be used a solvent, such as acetonitrile, to be commonly used as solvents for nonaqueous electrolytes. More specifically, there can be used dimethyl carbonate, methyl ethyl carbonate, dimethyl carbonate, dipropyl carbonate, methyl propyl carbonate, ethylene carbonate, propylene carbonate, butylene carbonate, γ-butyrolactone, 1,2-dimethoxyethane, sulfolane, dioxolane, methyl propionate or the like. These solvents may be used singly or as a mixture of two or more. From the viewpoint of more easily dissolving a solute described later and more enhancing lithium ion conductivity, however, it is preferable to use a mixed solvent of two or more kinds.

The solute is not especially limited, and preferable is, for example, $LiClO_4$, $LiBF_4$, $LiPF_6$, $LiAsF_6$, $LiCF_3SO_3$, LiBOB (lithium bis(oxalato)borate) or $LiN(SO_2CF_3)_2$. In this case, the solute can be more easily dissolved in solvents.

The concentration of the solute contained in an electrolyte solution is preferably 0.5 mol/L or higher and 2.0 mol/L or lower. With the concentration of the solute being lower than 0.5 mol/L, a desired lithium ion conductivity is not developed in some cases. On the other hand, with the concentration of the solute being higher than 2.0 mol/L, the solute does not dissolve more in some cases. Here, the nonaqueous electrolyte may contain minute amounts of additives such as a flame retardant and a stabilizer.

EXAMPLES

Hereinafter, the present invention will be described more specifically by way of Examples, but the present invention is not any more limited to these Examples, and changes and modifications may suitably be made without changing its gist.

Example 1

Production Example of a Positive Electrode Active Material $LiCo_{1/3}Ni_{1/3}Mn_{1/3}O_2$ as a positive electrode active material to be used in the present Example was fabricated by a method described in a Non Patent Literature (Journal of PowerSources, Vol. 146, pp. 636-639 (2005)).

First, lithium hydroxide and a ternary hydroxide of cobalt, nickel and manganese of 1:1:1 in molar ratio were mixed to thereby obtain a mixture. Then, the mixture was heated in an air atmosphere at 1,000° C. to thereby fabricate a positive electrode active material.

Production Example 1 of a First Carbon Material:

First, 10 g of an expanded graphite (manufactured by Toyo Tanso Co., Ltd., trade name: "PF Powder 8F", BET specific surface area: 22 m$^2$/g), 20 g of a pyrolytic foaming agent (ADCA, manufactured by EIWA CHEMICAL IND. CO., LTD, trade name: "Vinyfor AC #R-K3", pyrolytic temperature: 210° C.), 200 g of a polypropylene glycol (manufactured by Sanyo Chemical Industries, Ltd., trade name: Sannix GP-3000", average molecular weight: 3,000), and 200 g of tetrahydrofuran were mixed to thereby prepare a raw material composition. The raw material composition was irradiated with ultrasonic waves of 100 W at an oscillating frequency of 28 kHz by an ultrasonic processing apparatus (manufactured by HONDA ELECTRONICS Co., LTD.) for 5 hours to thereby make the polypropylene glycol (PPG) to be adsorbed in the expanded graphite. Thus, a composition in which the polypropylene glycol was adsorbed to the expanded graphite was prepared.

Then, the composition in which the polypropylene glycol was adsorbed to the expanded graphite was molded by a solution casting method, and thereafter, the cast composition was heated at 80° C. for 2 hours, at 110° C. for 1 hour and at 150° C. for 1 hour in this order of thereby remove tetrahydrofuran (hereinafter, THF). Thereafter, the composition from which THF had been removed was subjected to a heat treatment at 110° C. for 1 hour, and further a heat treatment at 230° C. for 2 hours to thereby foaming the composition.

Further, the foamed composition was subjected to a heat treatment at a temperature of 450° C. for 0.5 hour to thereby fabricate a carbon material in which a part of the polypropylene glycol remained.

Finally, the carbon material was subjected to a heat treatment at 350° C. for 2.5 hours to thereby fabricate a first carbon material which had a graphite structure wherein graphite was partially exfoliated. The obtained first carbon material contained a resin of 15% by weight with respect to the total weight. Here, the amount of the resin was calculated by taking, as the amount of the resin, a weight loss in the heating range of 350° C. to 600° C. by using TG (manufactured by Hitachi High-Tech Science Corp., item number: "STA7300").

The D/G ratio being a peak intensity ratio between the D band and the G band in a Raman spectrum of the obtained first carbon material was measured, and was 0.6. Here, the Raman spectrum of the first carbon material was measured by using a Raman spectrophotometer (manufactured by Thermo Fisher Scientific Inc, trade name: "Nicolet Almega XR").

Further the D/G ratio was determined by taking, as the peak intensity of the D band, the maximum peak intensity in the range of 1,300 cm$^{-1}$ to 1,400 cm$^{-1}$ in the obtained Raman spectrum, and taking, as the peak intensity of the G band, the maximum peak intensity in the range of 1,500 cm$^{-1}$ to 1,600 cm$^{-1}$ therein.

The BET specific surface area of the obtained first carbon material was measured by using a specific surface area measuring instrument (manufactured by Shimadzu Corp., item number: "ASAP-2000", nitrogen gas), and was 120 m$^2$/g.

Then, the amount of methylene blue adsorbed of the obtained first carbon material was measured by the following procedure, and was 61.0 μmol/g. Then, the ratio y/x, where x represented the BET specific surface area and y represented the amount of methylene blue adsorbed, was 0.508.

The measurement of the amount of methylene blue adsorbed was carried out as follows. First, methanol solutions of methylene blue (manufactured by Kanto Chemical Co., Inc., analytical grade reagent) of 10.0 mg/L, 5.0 mg/L, 2.5 mg/L and 1.25 mg/L in methylene blue concentration were prepared in volumetric flasks, and the absorbance of each solution was measured by an ultraviolet-visible spectrometer (manufactured by Shimadzu Corp., item number: "UV-1600") and a calibration curve was fabricated. Then, a 10-mg/L methylene blue solution was prepared; the first carbon material (0.005 to 0.05 g, varied according to the BET value of the sample) as a measurement subject, the methylene blue solution (10 mg/L, 50 mL) and a stirrer bar were added in a 100-mL eggplant flask, and treated by an ultrasonic washer (manufactured by As One Co., Ltd.) for 15 min, and thereafter stirred in a cooling bath (25° C.) for 60 min. Further the resultant, after reaching the adsorption equilibrium, was separated to the first carbon material and a supernatant liquid by centrifugation; and the absorbances of the 10-mg/L methylene blue solution as the blank and the supernatant liquid were measured by an ultraviolet-visible spectrometer and the difference in absorbance between the blank and the supernatant liquid was calculated. Finally, from the difference in absorbance and the calibration curve, the decrease in the concentration of the methylene blue solution was calculated; and the amount of methylene blue adsorbed of the first carbon material surface as a measurement subject was calculated by the following formula (3).

Amount (μmol/g) of methylene blue adsorbed={decrease in the concentration (g/L) of the methylene blue solution×volume (L) of the measuring solvent}/{molecular weight of methylene blue (g/μmol)×mass (g) of the first carbon material used for the measurement}　　　Formula (3)

Then, the obtained first carbon material and a silicon powder (Nano Powder, purity: ≥98%, particle diameter: ≤100 nm, manufactured by Sigma-Aldrich Corp.) were mixed in a weight ratio of 1:1 in a sample bottle to thereby fabricate a mixed powder as a measuring sample. The fabricated mixed powder was placed on a reflection-free Si sample stage, which was then installed in an X-ray diffractometer (Smart Lab, manufactured by Rigaku Corp.). Thereafter, an X-ray diffraction spectrum was measured by a wide-angle X-ray diffractometry under the conditions of an X-ray source of CuKα (wavelength: 1.541 A), a measuring range of 3° to 80°, and a scanning speed of 5°/min. From the acquired measurement result, with a height d of the highest peak in the range of 2θ=28° or larger and smaller than 30° being normalized as 1, then a height c of the highest peak in the range of 2θ=24° or larger and smaller than 28° was calculated. Finally, the ratio between c and d, that is, c/d was calculated.

As a result, the ratio c/d, between the height c of the highest peak in the range of 2θ=24° or larger and smaller than 28° and the height d of the highest peak in the range of 2θ=28° or larger and smaller than 30°, was 0.60.

Production Example of an Active Material-Carbon Material Composite:

A composite of the positive electrode active material, the first carbon material and a second carbon material of Example 1 was fabricated by the following procedure.

First, as a second carbon material, 1 g of ethanol was added to 0.03 g of an acetylene black (manufactured by Denka Co., Ltd., product name: Denka Black), and treated by an ultrasonic washer (manufactured by As One Co., Ltd.) for 5 hours to thereby prepare a dispersion liquid of a second carbon material (hereinafter, a dispersion liquid 1 of the second carbon material of Example 1).

Here, the BET specific surface area of the acetylene black was 65 m$^2$/g.

The ratio y/x, where x represented a BET specific surface area of the acetylene black and y represented an amount of methylene blue adsorbed, was 0.12, and the D/G ratio was 0.95.

Then, 5 g of ethanol was added to 0.10 g of the first carbon material fabricated in the above Production Example 1, and treated by an ultrasonic washer (manufactured by As One Co., Ltd.) for 5 hours to thereby prepare a dispersion liquid of the first carbon material fabricated in the above Production Example 1 (hereinafter, a dispersion liquid 2 of the first carbon material of Example 1).

Then, 3 g of the positive electrode active material (LiCo$_{1/3}$Ni$_{1/3}$Mn$_{1/3}$O$_2$) fabricated in the above Production Example of the positive electrode active material was added to 9 g of ethanol, and stirred by a magnetic stirrer at 600 rpm for 10 min to thereby prepare a dispersion liquid of the positive electrode active material of Example 1.

Further the dispersion liquid of the positive electrode active material of Example 1 was dropped in the dispersion liquid 1 of the second carbon material of Example 1 by a syringe. Here, during the dropping, the dispersion liquid 1 of the second carbon material of Example 1 was continuously treated by an ultrasonic washer (manufactured by As One Co., Ltd.). Thereafter, the above dispersion liquid 2 of the first carbon material of Example 1 was similarly dropped and a mixed liquid of the dispersion liquids was stirred by a magnetic stirrer for 3 hours.

Finally, the mixed liquid of the dispersion liquids was suction filtrated, and thereafter vacuum dried at 110° C. for 1 hour to thereby fabricate a composite (active material-carbon material composite) of the positive electrode active material, the first carbon material and the second carbon material of Example 1. The amount thereof necessary for fabrication of a positive electrode was fabricated by repeating the above steps.

Production Example of a Positive Electrode:

A positive electrode of Example 1 was fabricated as follows.

First, a binder (PVdF, solid content concentration: 12% by weight, NMP solution) was mixed in 96 parts by weight of the composite so that the solid content of the binder became 4 parts by weight to thereby fabricate a slurry. Then, an aluminum foil (20 μm) was coated with the slurry, which was thereafter heated in an air-blast oven at 120° C. for 1 hour to remove the solvent and was thereafter vacuum dried at 120° C. for 12 hours. Then, similarly the back surface of the aluminum foil was also coated with the slurry followed by drying.

Finally, the resultant was pressed by a roll press machine to thereby fabricate a positive electrode (whose both surfaces were coated) of 3.2 g cc$^{-1}$ in electrode density. Here, the electrode density was calculated from the electrode weight per unit area and the thickness.

The capacity of the positive electrode was calculated from the electrode weight per unit area and the theoretical capacity of the positive electrode active material (150 mAh/g). As a result, the capacity of the positive electrode (both the surfaces) was 5.0 mAh/cm$^2$.

Production Example of a Negative Electrode:

A negative electrode of Example 1 was fabricated as follows.

First, a binder (PVdF, solid content concentration: 12% by weight, NMP solution) was mixed in 100 parts by weight of a negative electrode active material (artificial graphite) so that the solid content of the binder became 5 parts by weight to thereby fabricate a slurry. Then, a copper foil (20 μm) was coated with the slurry, which was thereafter heated in an air-blast oven, at 120° C. for 1 hour to remove the solvent and was thereafter vacuum dried at 120° C. for 12 hours. Then, similarly the back surface of the copper foil was also coated with the slurry followed by drying.

Finally, the resultant was pressed by a roll press machine to thereby fabricate a negative electrode of 1.7 g cc$^{-1}$ in electrode density. Here, the electrode density was calculated from the electrode weight per unit area and the thickness.

The capacity of the negative electrode was calculated from the electrode weight per unit area and the theoretical capacity of the negative electrode active material (350 mAh/g). As a result, the capacity of the negative electrode (both the surfaces) was 6.0 mAh/cm$^2$.

Production of a Nonaqueous Electrolyte Secondary Battery:

First, the fabricated positive electrode (electrode portion: 40 mm×50 mm), the fabricated negative electrode (electrode portion: 45 mm×55 mm), and a separator (polyolefin-based microporous membrane, 25 μm, 50 mm×60 mm) were laminated in the order of negative electrode/separator/positive electrode/separator/negative electrode so that the capacity of the positive electrode became 500 mAh (5 sheets of the positive electrode and 6 sheets of the negative electrode). Then, an aluminum tab and a nickel-plated copper tab were vibration welded to the positive electrode and the negative electrode on both ends, respectively; thereafter, the laminate was put in a baglike aluminum laminate sheet; and three sides of the sheet were thermally welded to thereby fabricate a nonaqueous electrolyte secondary battery before enclosure of an electrolyte solution. Further, the nonaqueous electrolyte secondary battery before enclosure of an electrolyte solution was vacuum dried at 60° C. for 3 hours; thereafter, 20 g of a nonaqueous electrolyte (ethylene carbonate/dimethyl carbonate each in ½% by volume, 1-mol/L LiPF$_6$) was injected and the sheet was sealed under reduced pressure to thereby fabricate a nonaqueous electrolyte secondary battery. Here, the steps so far were carried out in an atmosphere (dry box) of a dew point of −40° C. or lower. Finally, the nonaqueous electrolyte secondary battery was charged up to 4.25 V, thereafter allowed to stand at 25° C. for 100 hours; then, gases generated in the atmosphere (dry box) of a dew point of −40° C. or lower and a surplus electrolyte solution were removed; thereafter, sealing was again carried out under reduced pressure to thereby fabricate a nonaqueous electrolyte secondary battery of Example 1.

Example 2

A nonaqueous electrolyte secondary battery was fabricated as in Example 1, except for altering the amount of the first carbon material to 0.03 g and that of the second carbon material (acetylene black) to 0.10 g in Example 1.

Example 3

A nonaqueous electrolyte secondary battery was fabricated as in Example 1, except for using a carbon material produced in the below Production Example 2 of a first carbon material in place of the first carbon material of Example 1.

Production Example 2 of a First Carbon Material:

First, a mixture of 16 g of an expanded graphite (manufactured by Toyo Tanso Co., Ltd., trade name: "PF Powder 8F", BET specific surface area: 22 m²/g), 0.48 g of a carboxymethylcellulose (manufactured by Sigma-Aldrich Corp., average molecular weight: 250,000) and 530 g of water was irradiated with ultrasonic waves by an ultrasonic processing apparatus (manufactured by SMT Co., Ltd., UH-600SR) for 5 hours; thereafter, 80 g of a polyethylene glycol (manufactured by Sanyo Chemical Industries, Ltd., PG600) was added, and mixed for 30 min by a homogenizing mixer (manufactured by Tokushu Kika Kogyo Co., Ltd., T.K. HOMOMIXER MARKII) to thereby prepare a raw material composition.

Then, the fabricated raw material composition was subjected to a heat treatment at 150° C. to remove water. Thereafter, the composition from which water had been removed was subjected to a heat treatment at a temperature of 380° C. for 1 hour to thereby fabricate a carbon material in which a part of the polyethylene glycol remained.

Finally, the obtained carbon material was subjected to a heat treatment at 400° C. for 30 min and at 350° C. for 2 hours in this order to thereby fabricate a first carbon material which had a graphite structure wherein graphite was partially exfoliated. The obtained first carbon material contained a resin of 12% by weight with respect to the total weight. Here, the amount of the resin was calculated by taking, as the amount of the resin, a weight loss in the heating range of 200° C. to 600° C. by using TG (manufactured by Hitachi High-Tech Science Corp., item number: "STA7300").

Then, the D/G ratio, which was a peak intensity ratio between the D band and the G band in a Raman spectrum of the first carbon material obtained in Production Example 2 of Example 3 was measured, and was 0.234.

The BET specific surface area of the first carbon material obtained in Production Example 2 of Example 3 was measured by using a specific surface area measuring instrument (manufactured by Shimadzu Corp., item number: "ASAP-2000", nitrogen gas), and was 95 m²/g.

Then, the amount of methylene blue adsorbed of the first carbon material obtained in Production Example 2 of Example 3 was measured by the above procedure, and was 69.7 μmol/g. Then, the ratio y/x, where x represented the BET specific surface area and y represented the amount of methylene blue adsorbed, was 0.733. Then, the ratio c/d was measured by the above procedure, and was 0.61.

Example 4

A nonaqueous electrolyte secondary battery was fabricated as in Example 2, except for using the first carbon material produced in the above Production Example 2 in place of the first carbon material of Example 2.

Comparative Example 1

A nonaqueous electrolyte secondary battery was fabricated as in Example 1, except for using no active material-carbon material composite of Example 1 and fabricating a positive electrode by the following procedure and by using the following material.

The positive electrode of Comparative Example 1 was fabricated as follows. First, the positive electrode active material of Example 1 and the acetylene black were mixed in a ratio of 9.5:5 in weight ratio. Then, the binder (PVdF, solid content concentration: 12% by weight, NMP solution) was mixed so that the solid content of the binder became 5 parts by weight to thereby fabricate a slurry. Then, an aluminum foil (20 μm) was coated with the slurry, which was thereafter heated in an air-blast oven at 120° C. for 1 hour to remove the solvent and was thereafter vacuum dried at 120° C. for 12 hours. Finally, the resultant was pressed by a roll press machine to thereby fabricate a positive electrode of 3.2 g cc$^{-1}$ in electrode density. Here, the electrode density was calculated from the electrode weight per unit area and the thickness.

(Method of Measuring the Temperature Rise in Charge and Discharge at Large Currents)

The temperature rise in charge and discharge at large currents was measured by the following method. First, the nonaqueous electrolyte secondary batteries of Examples 1 to 4 and Comparative Example 1 were each put in a thermostatic chamber at 25° C., and connected to a charge and discharge device (HJ1005SD8, manufactured by Hokuto Denko Corp.). Then, the nonaqueous electrolyte secondary battery was charged at a constant current (current value: 100 mA, charge end voltage: 4.25 V). Then, the nonaqueous electrolyte secondary battery was, after the charging, halted for 1 min, and then discharged at 5,000 mA (large current) down to 2.5 V while the temperature rise was measured. The temperature was measured by pasting a thermocouple (K type) on the central part of the nonaqueous electrolyte secondary battery with an imide tape and by using a data logger (manufactured by Graphtec Corp., GL900APS), and the maximum temperature was recorded. The temperature rise was calculated as a difference between the maximum temperature and 25° C., and evaluated according to the following evaluation criteria.

Evaluation Criteria:

Excellent: the temperature rise was lower than 10° C.
Good: the temperature rise was 10° C. or higher and lower than 15° C.
Poor: the temperature rise was 15° C. or higher The results are shown in the following Table 1.

TABLE 1

|  | Temperature Rise (° C.) | Result of Evaluation |
| --- | --- | --- |
| Ex. 1 | 7° C. | Excellent |
| Ex. 2 | 11° C. | Good |
| Ex. 3 | 6° C. | Excellent |
| Ex. 4 | 12° C. | Good |
| Comp. Ex. 1 | 17° C. | Poor |

Examples 5 to 24 and Comparative Examples 2 to 17

In Examples 5 to 24 and Comparative Examples 2 to 17 each, a nonaqueous electrolyte secondary battery was fabricated and evaluated as in Example 1, except for altering the kind and the weight of the first carbon material and the kind and the weight of the second carbon material to those indicated in the following Tables 2 to 4. In Examples 9 to 16 and Comparative Examples 4 to 6, 12 and 13 each, as the second carbon material, an artificial graphite (manufactured by Fuji Kokuen Kogyo K.K., trade name: "CS5") was used in place of the acetylene black. In Examples 17 to 24 and Comparative Examples 7 to 9, 14 and 15 each, as the second carbon material, an expanded graphite (manufactured by Toyo Tanso Co., Ltd., trade name: "PF Powder 8F") was used in place of the acetylene black. In Comparative Examples 4 and 7 each, no first carbon material was used. In Comparative Example 16, no second carbon material was used. In Comparative Example 17, no first carbon material nor second carbon material was used. In Tables 2 to 4, the weight ratio (carbon materials/positive electrode active material) indicates (a weight of the carbon materials)/(a weight of the positive electrode active material). The weight of the carbon materials indicates the total weight of the first and second carbon materials. Then, the ratio A/B is a weight ratio when the weight of the first carbon material is taken as A and the weight of the second carbon material is taken as B.

TABLE 2

| | Kind of First Carbon Material | Weight of First Carbon Material (g) | Kind of Second Carbon Material | Weight of Second Carbon Material (g) | Weight of Positive Electrode Active Substance (g) | Ratio A/B | Weight Ratio (Carbon Materials/ Positive Electrode Active Substance) | Content of Carbon Materials in Electrode Material (% by weight) | Temperature Rise (° C.) | Result |
|---|---|---|---|---|---|---|---|---|---|---|
| Ex. 1 | Production Ex. 1 | 0.10 | acetylene black | 0.03 | 3 | 3.3 | 0.04 | 4 | 7 | Excellent |
| Ex. 2 | Production Ex. 1 | 0.03 | acetylene black | 0.10 | 3 | 0.3 | 0.04 | 4 | 11 | Good |
| Ex. 3 | Production Ex. 2 | 0.10 | acetylene black | 0.03 | 3 | 3.3 | 0.04 | 4 | 6 | Excellent |
| Ex. 4 | Production Ex. 2 | 0.03 | acetylene black | 0.10 | 3 | 0.3 | 0.04 | 4 | 12 | Good |
| Ex. 5 | Production Ex. 1 | 0.10 | acetylene black | 0.001 | 3 | 100.0 | 0.03 | 3 | 6 | Excellent |
| Ex. 6 | Production Ex. 1 | 0.001 | acetylene black | 0.10 | 3 | 0.01 | 0.03 | 3 | 11 | Good |
| Ex. 7 | Production Ex. 2 | 0.10 | acetylene black | 0.001 | 3 | 100.0 | 0.03 | 3 | 5 | Excellent |
| Ex. 8 | Production Ex. 2 | 0.001 | acetylene black | 0.10 | 3 | 0.01 | 0.03 | 3 | 12 | Good |
| Ex. 9 | Production Ex. 1 | 0.10 | artificial graphite | 0.03 | 3 | 3.3 | 0.04 | 4 | 5 | Excellent |
| Ex. 10 | Production Ex. 1 | 0.03 | artificial graphite | 0.10 | 3 | 0.3 | 0.04 | 4 | 10 | Good |
| Ex. 11 | Production Ex. 1 | 0.10 | artificial graphite | 0.001 | 3 | 100.0 | 0.03 | 3 | 8 | Excellent |
| Ex. 12 | Production Ex. 1 | 0.001 | artificial graphite | 0.10 | 3 | 0.01 | 0.03 | 3 | 12 | Good |
| Ex. 13 | Production Ex. 2 | 0.10 | artificial graphite | 0.03 | 3 | 3.3 | 0.04 | 4 | 5 | Excellent |
| Ex. 14 | Production Ex. 2 | 0.03 | artificial graphite | 0.10 | 3 | 0.3 | 0.04 | 4 | 13 | Good |

TABLE 3

| | Kind of First Carbon Material | Weight of First Carbon Material (g) | Kind of Second Carbon Material | Weight of Second Carbon Material (g) | Weight of Positive Electrode Active Substance (g) | Ratio A/B | Weight Patio (Carbon Materials/ Positive Electrode Active Substance) | Content of Carbon Materials in Electrode Material (% by weight) | Temperature Rise (° C.) | Result |
|---|---|---|---|---|---|---|---|---|---|---|
| Ex. 15 | Production Ex. 2 | 0.10 | artificial graphite | 0.001 | 3 | 100.0 | 0.03 | 3 | 7 | Excellent |
| Ex. 16 | Production Ex. 2 | 0.001 | artificial graphite | 0.10 | 3 | 0.01 | 0.03 | 3 | 14 | Good |
| Ex. 17 | Production Ex. 1 | 0.10 | expanded graphite | 0.03 | 3 | 3.3 | 0.04 | 4 | 8 | Excellent |
| Ex. 18 | Production Ex. 1 | 0.03 | expanded graphite | 0.10 | 3 | 0.3 | 0.04 | 4 | 12 | Good |
| Ex. 19 | Production Ex. 1 | 0.10 | expanded graphite | 0.001 | 3 | 100.0 | 0.03 | 3 | 9 | Excellent |
| Ex. 20 | Production Ex. 1 | 0.001 | expanded graphite | 0.10 | 3 | 0.01 | 0.03 | 3 | 13 | Good |
| Ex. 21 | Production Ex. 2 | 0.10 | expanded graphite | 0.03 | 3 | 3.3 | 0.04 | 4 | 7 | Excellent |
| Ex. 22 | Production Ex. 2 | 0.03 | expanded graphite | 0.10 | 3 | 0.3 | 0.04 | 4 | 13 | Good |
| Ex. 23 | Production Ex. 2 | 0.10 | expanded graphite | 0.001 | 3 | 100.0 | 0.03 | 3 | 8 | Excellent |
| Ex. 24 | Production Ex. 2 | 0.001 | expanded graphite | 0.10 | 3 | 0.01 | 0.03 | 3 | 14 | Good |
| Comp. Ex. 1 | — | — | acetylene black | 0.16 | 3 | 0.0 | 0.05 | 5 | 17 | Poor |
| Comp. Ex. 2 | Production Ex. 1 | 0.10 | acetylene black | 0.0005 | 3 | 200.0 | 0.03 | 3 | 15 | Poor |
| Comp. Ex. 3 | Production Ex. 1 | 0.0005 | acetylene black | 0.10 | 3 | 0.0 | 0.03 | 3 | 16 | Poor |
| Comp. Ex. 4 | — | — | artificial graphite | 0.16 | 3 | 0.0 | 0.05 | 5 | 17 | Poor |

TABLE 4

| | Kind of First Carbon Material | Weight of First Carbon Material (g) | Kind of Second Carbon Material | Weight of Second Carbon Material (g) | Weight of Positive Electrode Active Substance (g) | Ratio A/B | Weight Ratio (Carbon Materials/ Positive Electrode Active Substance) | Content of Carbon Materials in Electrode Material (% by weight) | Temperature Rise (° C.) | Result |
|---|---|---|---|---|---|---|---|---|---|---|
| Comp. Ex. 5 | Production Ex. 1 | 0.10 | artificial graphite | 0.0005 | 3 | 200.0 | 0.03 | 3 | 17 | Poor |
| Comp. Ex. 6 | Production Ex. 1 | 0.0005 | artificial graphite | 0.10 | 3 | 0.0 | 0.03 | 3 | 17 | Poor |

TABLE 4-continued

| | Kind of First Carbon Material | Weight of First Carbon Material (g) | Kind of Second Carbon Material | Weight of Second Carbon Material (g) | Weight of Positive Electrode Active Substance (g) | Ratio A/B | Weight Ratio (Carbon Materials/ Positive Electrode Active Substance) | Content of Carbon Materials in Electrode Material (% by weight) | Temperature Rise (° C.) | Result |
|---|---|---|---|---|---|---|---|---|---|---|
| Comp. Ex. 7 | — | — | expanded graphite | 0.16 | 3 | 0.0 | 0.05 | 3 | 18 | Poor |
| Comp. Ex. 8 | Production Ex. 1 | 0.10 | expanded graphite | 0.0005 | 3 | 200.0 | 0.03 | 3 | 18 | Poor |
| Comp. Ex. 9 | Production Ex. 1 | 0.0005 | expanded graphite | 0.10 | 3 | 0.0 | 0.03 | 3 | 18 | Poor |
| Comp. Ex. 10 | Production Ex. 2 | 0.10 | acetylene black | 0.0005 | 3 | 200.0 | 0.03 | 3 | 17 | Poor |
| Comp. Ex. 11 | Production Ex. 2 | 0.0005 | acetylene black | 0.10 | 3 | 0.0 | 0.03 | 3 | 20 | Poor |
| Comp. Ex. 12 | Production Ex. 2 | 0.10 | artificial graphite | 0.0005 | 3 | 200.0 | 0.03 | 3 | 17 | Poor |
| Comp. Ex. 13 | Production Ex. 2 | 0.0005 | artificial graphite | 0.10 | 3 | 0.0 | 0.03 | 3 | 18 | Poor |
| Comp. Ex. 14 | Production Ex. 2 | 0.10 | expanded graphite | 0.0005 | 3 | 200.0 | 0.03 | 3 | 19 | Poor |
| Comp. Ex. 15 | Production Ex. 2 | 0.0005 | expanded graphite | 0.10 | 3 | 0.0 | 0.03 | 3 | 19 | Poor |
| Comp. Ex. 16 | Production Ex. 1 | 0.10 | — | — | 3 | — | 0.03 | 3 | 24 | Poor |
| Comp. Ex. 17 | — | — | — | — | 3 | — | — | — | not operated | Poor |

As is clear from Table 1 to Table 4, in Examples 1 to 24, it was confirmed that the effect of resistance reduction of the positive electrode was large and the heat generation was suppressed.

The invention claimed is:

1. An electrode material for electricity storage devices, comprising:
   a first carbon material having a graphite structure wherein graphite is partially exfoliated;
   a second carbon material different from the first carbon material; and
   a positive electrode active material,
   wherein the first carbon material and the second carbon material are electroconductive auxiliary agents,
   the second carbon material is at least one selected from the group consisting of artificial graphite, granular graphite compounds, and fibrous graphite compounds,
   a total content of the first carbon material and the second carbon material in the electrode material for electricity storage devices is 0.2% by weight or higher and 5% by weight or lower; and
   a ratio A/B, where A represents a weight of the first carbon material and B represents a weight of the second carbon material, is within the range of 0.01 or higher and 100 or lower.

2. The electrode material for electricity storage devices according to claim 1, wherein the ratio A/B is within the range of 0.05 or higher and 20 or lower.

3. The electrode material for electricity storage devices according to claim 1, wherein the ratio A/B is within the range of 0.1 or higher and 10 or lower.

4. The electrode material for electricity storage devices according to claim 1, wherein a ratio y/x is 0.15 or higher where y represents an amount (μmol/g) of methylene blue adsorbed per g of the first carbon material measured based on a difference in absorbance between a methanol solution of methylene blue having a concentration of 10 mg/L and a supernatant liquid obtained by placing the first carbon material in the methanol solution of methylene blue and centrifuging the mixture, and x represents a BET specific surface area ($m^2/g$) of the first carbon material.

5. The electrode material for electricity storage devices according to claim 1, wherein a ratio D/G, where the D/G ratio represents a peak intensity ratio between the D band in a Raman spectrum of the first carbon material and the G band therein, is within the range of 0.05 or higher and 0.8 or lower.

6. The electrode material for electricity storage devices according to claim 1, wherein the second carbon material is at least one selected from the group consisting of granular graphite compounds and fibrous graphite compounds.

7. The electrode material for electricity storage devices according to claim 1, wherein the electrode material is a composite of the positive electrode active material, the first carbon material and the second carbon material.

8. The electrode material for electricity storage devices according to claim 1, wherein when an X-ray diffraction spectrum of a mixture of the first carbon material and Si in a weight ratio of 1:1 is measured, a ratio c/d between a height c of the highest peak in the range of 2θ of 24° or larger and smaller than 28° and a height d of the highest peak in the range of 2θ of 28° or larger and smaller than 30° is 0.2 or higher and 1.0 or lower.

9. An electrode for electricity storage devices, comprising the electrode material for electricity storage devices according to claim 1.

10. An electricity storage device, comprising the electrode for electricity storage devices according to claim 9.

11. The electrode material for electricity storage devices according to claim 1, wherein the second carbon material consists of carbon nanohorns, and the only carbon materials contained in the electrode material are the first and second carbon materials.

12. The electricity storage device according to claim 10, further comprising a separator consisting of a microporous membrane of cellulose containing a flame retardant.

* * * * *